(12) United States Patent
Frens

(10) Patent No.: US 8,746,714 B2
(45) Date of Patent: Jun. 10, 2014

(54) CAM-ADJUSTABLE CONTROL ARM

(75) Inventor: James Roger Frens, Estes Park, CO (US)

(73) Assignee: Niwot Corporation, Longmont, CO (US)

( * ) Notice: Subject to any disclaimer, the term of this patent is extended or adjusted under 35 U.S.C. 154(b) by 0 days.

(21) Appl. No.: 13/285,924

(22) Filed: Oct. 31, 2011

(65) Prior Publication Data
US 2012/0104713 A1 May 3, 2012

Related U.S. Application Data

(60) Provisional application No. 61/408,493, filed on Oct. 29, 2010.

(51) Int. Cl.
*B62D 17/00* (2006.01)
*B60G 7/00* (2006.01)

(52) U.S. Cl.
CPC ............... *B62D 17/00* (2013.01); *B60G 7/003* (2013.01); *B60G 2204/42* (2013.01); *B60G 2204/61* (2013.01); *B60G 2200/46* (2013.01); *B60G 2200/4622* (2013.01); *B60G 2200/464* (2013.01); *B60G 2206/1112* (2013.01)
USPC ................................. 280/86.757; 280/86.753

(58) Field of Classification Search
CPC ........ B62D 17/00; B60G 7/001; B60G 7/003; B60G 2204/42; B60G 2204/61; B60G 2200/46; B60G 2200/462; B60G 2200/4622; B60G 2200/464; B60G 2206/1112; B60G 2206/111
USPC .............. 280/86.751, 86.75, 86.757, 86.753, 280/86.754, 86.755
See application file for complete search history.

(56) References Cited

U.S. PATENT DOCUMENTS

| | | | | |
|---|---|---|---|---|
| 4,267,896 | A | * | 5/1981 | Hendriksen ................ 280/86.75 |
| 4,616,845 | A | * | 10/1986 | Pettibone ................. 280/86.753 |
| RE33,179 | E | * | 3/1990 | Pettibone ................. 280/86.753 |
| 5,398,411 | A | * | 3/1995 | Kusaka et al. ............... 29/897.2 |
| 7,278,648 | B2 | * | 10/2007 | Bobbitt et al. ........... 280/86.751 |
| 8,356,839 | B1 | * | 1/2013 | Vey ............................... 280/788 |
| 2004/0108672 | A1 | * | 6/2004 | Enck ........................ 280/86.755 |
| 2005/0156398 | A1 | * | 7/2005 | Ramsey ................. 280/124.116 |
| 2007/0013171 | A1 | * | 1/2007 | Tuthill et al. .................. 280/684 |

OTHER PUBLICATIONS

Definition of "channel" from Webster's Third New International Dictionary, Unabridged, Copyright 1993.*

* cited by examiner

*Primary Examiner* — Keith Frisby
(74) *Attorney, Agent, or Firm* — Dorsey & Whitney LLP

(57) ABSTRACT

The present invention includes a cam, an arm plate, and a slide plate, wherein the cam defines at least one opening, the arm plate defines at least one channel, and the slide plate defines at least one hole. The control arm length may be adjusted by rotation of the cam and fixedly securing the cam to the arm plate to the slide plate with a bolt and at least one bolt securing device.

18 Claims, 17 Drawing Sheets

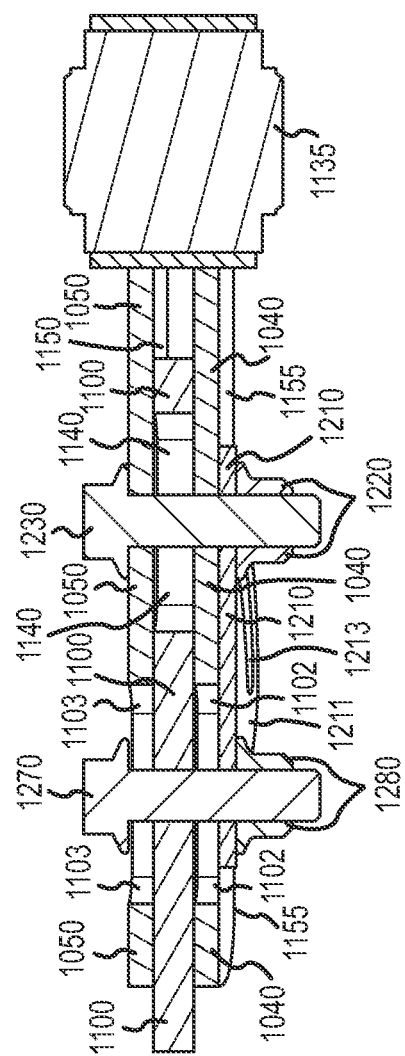

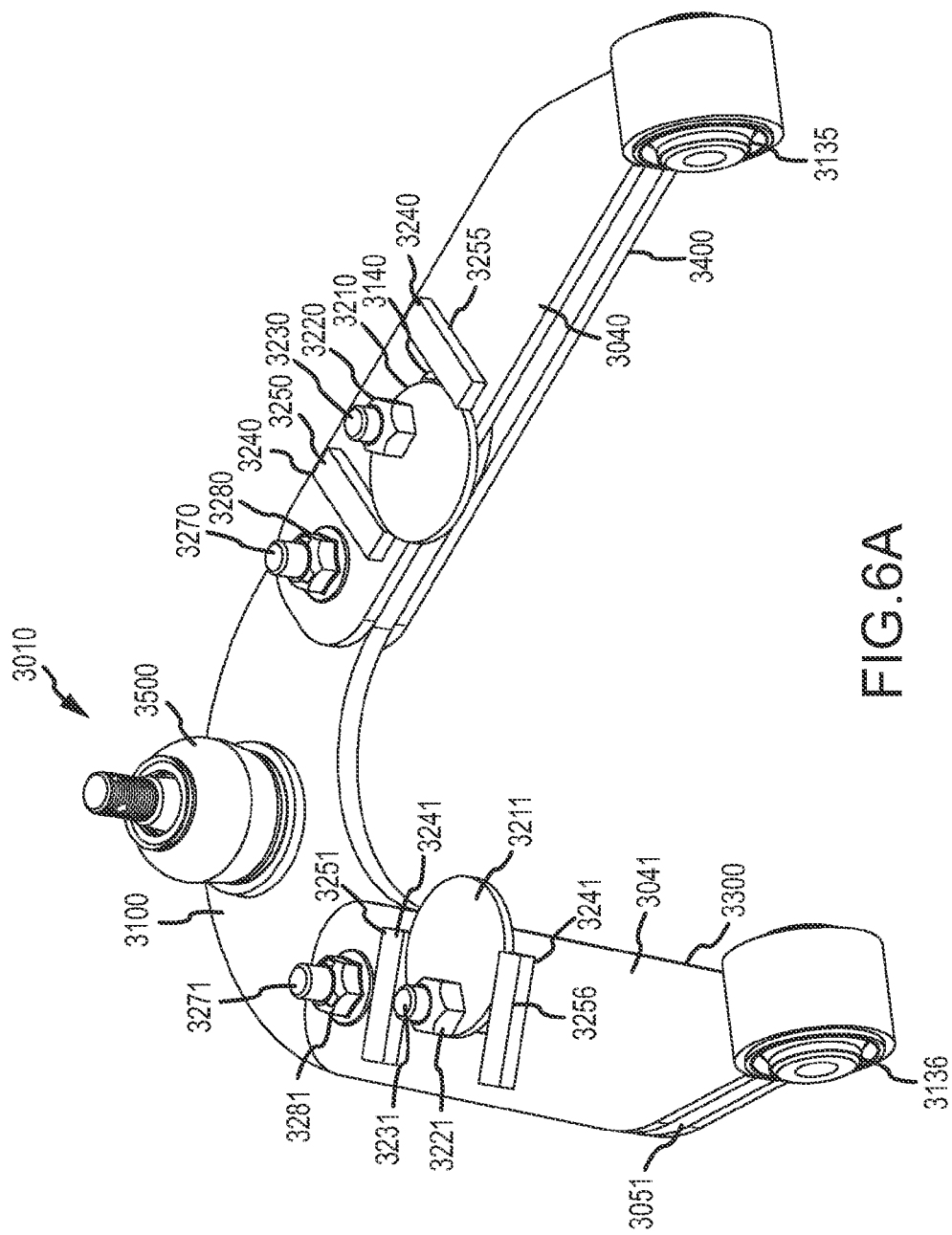

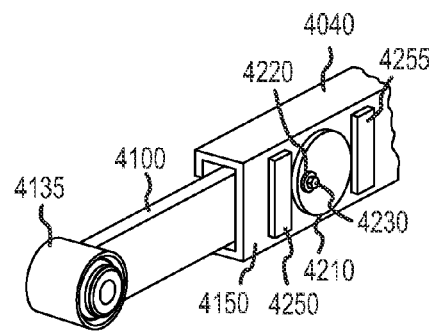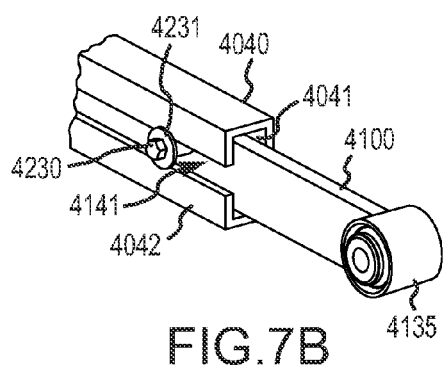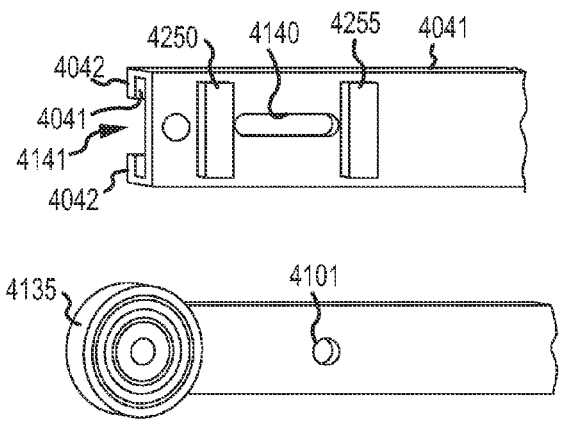

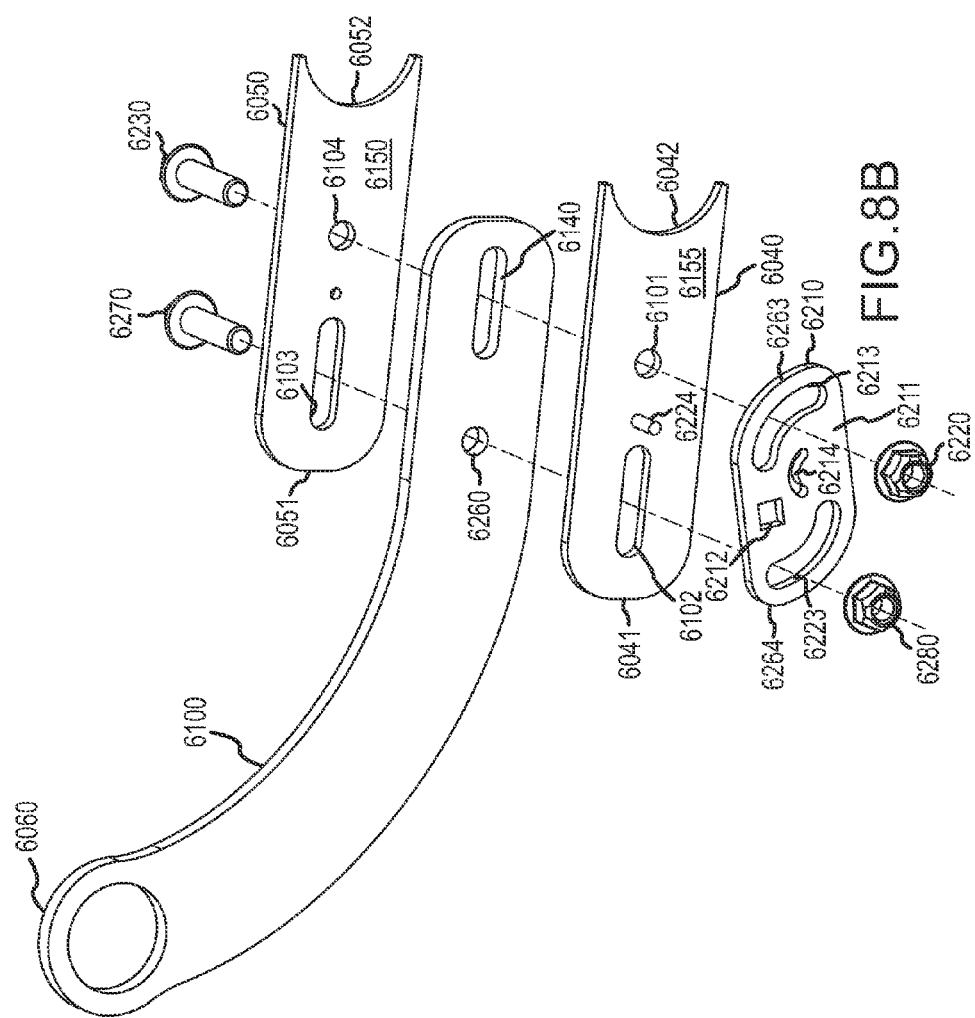

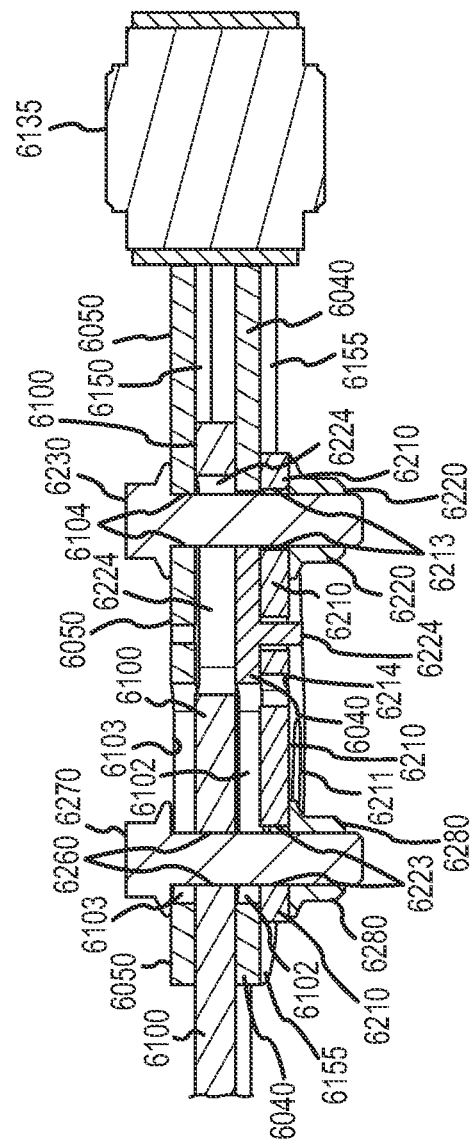

CAM-ADJUSTABLE CONTROL ARM

CROSS-REFERENCE TO RELATED APPLICATIONS

This application claims benefit of priority pursuant to 35 U.S.C. §119(e) of U.S. provisional patent application No. 61/408,493 filed Oct. 29, 2010, which is hereby incorporated by reference in its entirety.

TECHNICAL FIELD

The present disclosure relates to suspension systems for vehicles, and more particularly, control arms that may be elongated or shortened by rotation of a cam structure, without removal of the control arm from the vehicle.

BACKGROUND

Vehicles having more than one wheel often include a suspension system to aid in regulating the vehicle's ride and handling. Generally, the suspension system may include a control arm, which may connect a wheel assembly to the frame of a car. The length of a control arm may vary from one type or make of vehicle to another. The length of the control arm may also vary depending on the desired ride and handling characteristics. The length of a control arm may determine the angle of the wheel in relation to a road surface, for example camber, caster, or toe.

Camber angle is a measure of how much a wheel or tire on a vehicle leans or tilts, either inward toward, or outward from, the vehicle, when viewed from the front or back. As such, the camber angle can be defined in different ways by measuring the relative positions of various components on a vehicle. Where a wheel is tilted such that the upper part of the wheel is closer to the vehicle, the camber is said to be negative. Where the top of the wheel is farther from the vehicle, the camber angle is said to be positive.

The caster angle is typically defined by the angle between a vertical line and a line drawn through upper and lower steering pivots, as viewed from either side of the vehicle. As such, the caster angle can be defined in different ways by measuring the relative positions of various components on a vehicle. For example, the caster angle can be defined as the angle between a vertical line and a caster reference line drawn either through an upper strut mount and a lower ball joint or through an upper ball joint and the lower ball joint.

The toe angle is typically defined by the angle between a horizontal line drawn down the centerline of the vehicle and a line drawn perpendicular to the center axis of the tire and wheel assembly as viewed from either above or below. As such the toe angle can be defined in different ways by measuring the relative positions of various components on a vehicle. Where the forward edge of the tire is closer to the mid-plane of the vehicle than the back edge, the toe angle is said to be positive. Where the forward edge is farther from the mid-plane, the toe angle is said to be negative.

Adjustment of the camber, caster, and toe angles may affect the handling characteristics of a vehicle. For example, camber may be altered to allow for differing cornering characteristics. In some cases, these angles, and therefore a vehicle's handling characteristics, may be adjusted by choosing control arms having different lengths. In addition, when replacing damaged, worn out, or factory installed control arms with new control arms, the new control arm may have a slightly different length making the installation difficult. Changing of control arms on a vehicle often requires difficult and time consuming adjustments. Thus, a vehicle owner may choose to forego altering driving characteristics to avoid the expense and difficulty of swapping control arms.

What is needed is an adjustment mechanism that allows a vehicle owner or mechanic to alter control arm length to fit different vehicles and/or to easily alter the handling and ride characteristics of a vehicle without the need to remove or exchange a control arm.

The inventive adjustable control arm presented here provides for adjustment of control arm length with a cam structure, which may avoid the need to disassemble the wheel assembly and/or remove the control arm from the vehicle.

BRIEF SUMMARY

Aspects of the present invention include the use of a cam for adjusting the length of an upper control arm for use on a vehicle suspension system. The cam adjustment assemblies described and depicted herein may be used in various configurations of control arms. The cam adjustment mechanism may allow a user to make various adjustments during control arm installation and/or wheel alignment. More particularly, the present invention allows a user to adjust the length of a control arm in order to fit different vehicles, or to adjust handling and ride characteristics. Although the present invention is described and depicted herein with reference to a motor vehicle suspension system, it is to be appreciated that the embodiment of the present invention can be utilized with other types of suspension systems where a control arm is used.

In one aspect of the invention, the control arm comprises a cam, a cam bolt, an arm plate and a slide plate. The arm plate may define a first attachment end, and the slide plate may define a second attachment end. The attachment ends provide for connecting the control arm to a wheel assembly and a vehicle frame. The cam is positioned against the arm plate and the arm plate is positioned against the slide plate. The cam surface defines a hole, a cam hole, through the cam. The cam hole is positioned off-center. The cam hole is designed to accept the cam bolt. The arm plate defines a channel through the arm plate, and a plurality of ridges or cam stops on the exterior surface of the arm plate. In some instances one cam stop may be needed. The channel in the arm plate is designed to accept the cam bolt and allow it to be repositioned within the channel by a sliding motion. The channel is elongated and runs generally along (such as parallel) to the slide plate and/or arm plate. The slide plate defines a hole designed to accept the cam bolt. The cam bolt may be inserted into the hole in the slide plate, pass through the slide plate, the arm plate, and the cam, and be fixedly attached to a nut. The length of the control arm may be adjusted by rotating the cam, which may cause the cam bolt to be repositioned within the arm plate channel, and the slide arm to move in relation to the arm plate. The length of the control arm may be set by fixedly securing the cam bolt by a cam securing device, for example a nut, such that the slide plate and arm plate are fixed so as to not move in relation to each other.

In a further aspect of the inventive control arm, there may be a plurality of arm plates. The control arm may have a second arm plate, such that the slide plate is positioned between two arm plates, which have corresponding channels for receiving a cam bolt. In this embodiment the slide plate may also define a channel, which slide plate channel may be positioned next to a corresponding hole defined by the arm plates. The arm plate holes and the slide plate channel may be designed to receive, and allow to pass through, a second bolt.

The second bolt may also be fixedly attached to a nut or other device for securing the bolt. A second arm plate may or may not have ridges or cam stops.

In a further aspect of the inventive control arm, the surface of the cam may have a plurality of openings. This embodiment has a cam with a hole for receiving a pivot bolt, and a second opening, a channel for receiving a cam bolt. The pivot bolt may pass through a channel in the arm plate and a hole in the slide plate.

BRIEF DESCRIPTION OF THE DRAWINGS

FIG. 3C is a section view of the control arm of FIG. 3A along line 3C-3C.

FIG. 6A is a perspective view of an embodiment of the inventive cam-adjustable control arm having multiple cams.

FIG. 7A is a side perspective view of another embodiment of a control arm.

FIG. 7B is an opposite side view of the control arm of 7A.

FIG. 7C is a view of the slide plate and arm plate of the control arm of 7A.

FIG. 8B is an exploded view of the control arm of FIG. 8A.

FIG. 8C is a section view taken along the length of the control arm shown in FIG. 8A.

DETAILED DESCRIPTION

Aspects of the present invention include the use of a cam for adjusting the length of a control arm (upper or lower) for use on motor vehicle suspension systems. The cam adjustment assemblies described and depicted herein are for use in various configurations of control arms that allow a user to make various adjustments during control arm installation and/or wheel alignment. More particularly, the present invention allows a user to adjust the length of the control arm for various purposes. Although the present invention is described and depicted herein with reference to a motor vehicle suspension system, it is to be appreciated that the embodiment of the present invention can be utilized with other types of suspension systems that require control arms.

Figure 1A:
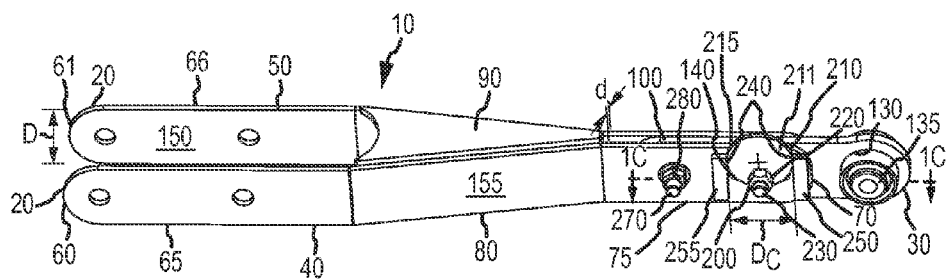
FIG. 1A is a perspective view of an embodiment of the inventive cam-adjustable control arm.

One embodiment of the inventive control arm assembly 10 is shown in FIG. 1A. The control arm assembly 10 may be defined as having a first attachment end 20 and a second attachment end 30. At the first attachment end 20 may be two flattened, elongated arm plates 40,50. The first attachment end 20 is typically attached to the frame of an automobile (not shown) in a known manner. The second attachment end 30 of the control arm assembly 10 is typically attached to a wheel assembly (see FIG. 1D) in a known manner. It is contemplated that the orientation of the first attachment end 20 and the second attachment end 30 may be reversed if desired as the orientation is not material to the function, structure and method of the cam adjustment mechanism(s) described herein. The orientation used herein is for explanation purposes. There is a front arm plate 40, and a back arm plate 50, which may be separated by a distance, D. In the orientation depicted in FIG. 1A, the plates 40,50 have a proximal end 60,61, respectively, and a distal end 70,71 respectively. At or near the proximal ends 60,61, the plates 40,50 may define proximal sections 65,66. At or near the distal ends 70,71, the plates 40,50, may define distal sections 75,76. The front and back arm plates 40,50 may be generally parallel to each other over their respective proximal sections 65,66 and distal sections 75,76, which may each comprise approximately ⅓ of the length of the plates 40,50 from proximal sections 65,66 to distal sections 75,76. The middle third of the plates may define a middle section 80,81 wherein the arm plates 40,50 change their separation distance, and may angle toward each other. The middle sections 80,81 of the plates may also be generally flat. The plates 40,50 are angled toward each other until they are separated by a distance d, which is smaller than the distance D. From the point at which the plates 40,50 are separated by a distance d, until the distal ends 70,71 of the plates 40,50, the plates 40,50 may again be parallel relative to each other. The plates may be fixedly connected by an arm plate gusset 90. The gusset 90 may be generally triangular in shape and may be positioned on the top and bottom of the control arms 40,50, or could be on the top, bottom or central region of the control arm, or use a crush sleeve or the like in the middle section 80 of the arm plates 40,50. In the embodiment depicted in FIGS. 1A and 1B, the gusset 90 is positioned on top of the arm plates 40,50. The particular shape and structure of the gusset 80 is not important to the operation of the cam adjustment mechanism(s) described herein.

A slide plate 100 may be positioned between the front arm plate 40, and the back arm plate 50 at or near their respective distal sections 75,76. The slide plate 100 may be generally flat and have a shape similar to, but shorter than the arm plates 40,50. The slide plate 100 may have a first, proximal end 110 that is positioned between the arm plates 40,50 and a second, distal end 120 that extends beyond the distal end 70 of the arm plates 40,50. The second, distal end 120 of the slide plate may define the second attachment end 30 of the control arm assembly 10. The second, distal end 120 of the slide arm 100 may also define an opening 130. The opening 130 may be for positioning a bushing 135, which may be connectedly attached to a vehicle frame or to a wheel assembly. The opening 130 of the slide plate 100 may be referred to as a bushing hole 130

Positioned at or near the distal ends 70,71 of the arm plates 40,50 may be arm plate channels 140,141. The arm plate channel 140 of the front arm plate 50 defining an elongated hole through the front arm plate 40 and arm plate channel 141 of the back arm plate 50 extending from an interior surface 150 to an exterior surface 155 of the back arm plate 50. The arm plate channels 140,141 may run generally parallel to the long axis of the arm plates 40,50, which is generally defined by a line connecting the proximal ends 60,61 and distal ends 70,71 of the arm plates 40,50. In some embodiments the control arm may not be straight. In these embodiments the major axis may be defined by the portion of the slide plate 100 and the arm plates 40,50 that substantially overlap. In FIG. 1A, that overlap section is seen in the distal sections 75,76 of the arm plates 40,50. In FIG. 1A, the arm plate channel 140 of the front arm plate 140 is partially visible as it is obscured by a cam adjustment assembly 200. The arm plate channel 141 of the back arm plate 50 is visible in FIG. 1B.

Figure 1B:
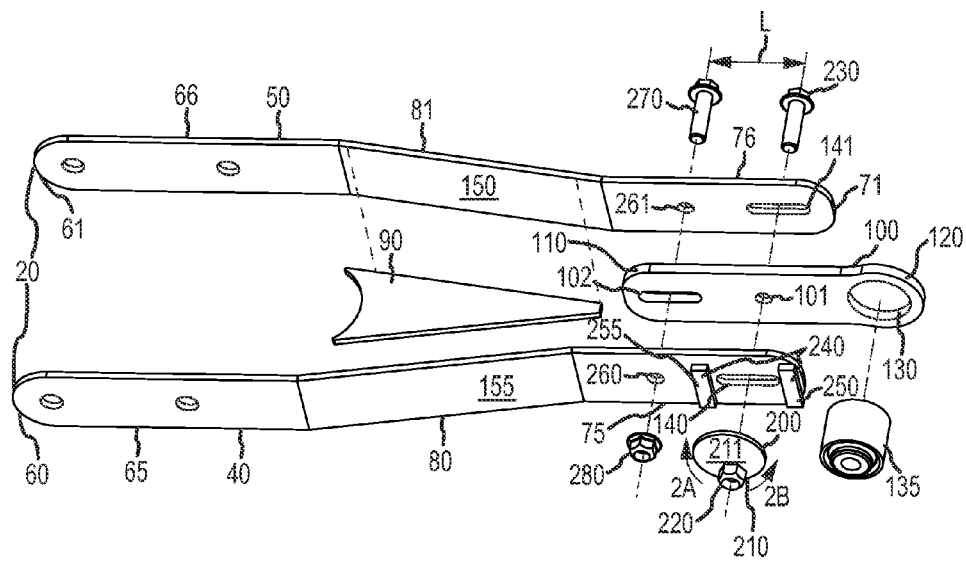
FIG. 1B is an exploded view of the control arm of FIG. 1A.

The cam adjustment assembly 200 is comprised of a cam 210, a cam-nut 220, and a cam-bolt 230. The cam 210 is a generally flat, circular piece of metal with a screw-nut, the cam nut 220, positioned off-center. The center of the cam 210 is identified by a cross in FIG. 1A. The cam 210 and cam-nut 220 may be fixedly attached and comprise a single piece of metal. In some embodiments the cam-nut 220 may be welded to the cam 210, or fixedly connected by other methods. In other embodiments the cam 210 and cam-nut 220 are manufactured, machined, or molded from a single piece of metal. The cam adjustment assembly 200 may be positioned at the exterior surface 155 of either the front arm plate 40 or the exterior surface 156 (not shown) of the back arm plate 50. The embodiment of FIGS. 1A and 1B depict the cam adjustment assembly as being positioned on the exterior surface 155 of the front arm 40, and about the arm plate channel 140 of the front arm 40. The cam 210 may have a diameter $D_c$. Positioned on either side of the arm plate channel 140 of the front arm 50 may be a ridge 240, fin, or protrusion extending out from the exterior surface 155 of the front arm plate 40 (or in some embodiments the exterior surface 156 of the back arm plate 50), and running perpendicular to the arm plate channel 140. The ridges 240 may define a front cam stop 250 positioned closest to the distal end 70,71 of the arm plate 40,50 and a back cam stop 255 positioned closest to the proximal end 60,61 of the arm plate 40,50. Embodiments having a cam assembly positioned on the exterior surface of the back arm plate will also include ridges defining front and back cam stops. The distance between the front cam stop 250 and back cam stop 255, $d_c$, may be approximately equal to or slightly greater than the diameter of the cam, $D_c$.

The cam 210 may be designed to make contact with both the front cam stop 250 and the back cam stop 255 at the same time such that rotation of the cam 210 between the front cam stop 250 and back cam stop 255 will maintain contact between the cam 210 and the cam stops 250,255. Each arm plate defines an arm plate hole 260,261. In the embodiment of FIGS. 1A and 1B, the arm plate holes 260,261 are positioned nearer the proximal ends 60,61 of the arm plates 40,50. As depicted in FIG. 1B, the arm plate holes 260,261 extend from the interior surfaces 150,151 of the arm plates 40,50 through the arm plate 40,50 to their exterior surfaces 155,156 of the arm plate 40,50. The arm plate hole 260 of the front arm plate 40 is not visible in FIG. 1A because it is positioned beneath an arm bolt 270 and an arm nut 280. In FIG. 1B, the arm plate hole 260 of the front arm plate 40 and the arm plate hole 261 of the back arm plate 50 are both visible.

In the embodiment of FIG. 1A, the cam 210 is flat and round, and the cam-nut 220 is positioned near the edge 215 of the cam 210. In other embodiments the cam 210 may take various shapes and sizes, for example, ellipsoid, oblong, or oval, or a shape with at least one straight edge. The cam 210 defines a cam hole (not shown), which extends from an exterior surface 211 of the cam 210 to an interior surface of the cam 210. The hexagonal cam-nut 220 is positioned on the exterior surface 211 of the cam 210 over the cam hole. Some embodiments may have a cam-nut 220 and cam hole positioned away from the cam edge 215, for example at the focus of an ellipse. In still further embodiments the cam-nut 220 may have a shape other than hexagonal. In some embodiments the cam-nut 220 may be designed to be operably engaged with a specific tool or device to aid in turning the cam 210 and cam adjustment assembly 200. In some embodiments the cam 210 exterior surface 211 may further define a lever, hole, or other structure to aid in rotating the cam 210. In some embodiments the cam 210 stops may be other than straight.

FIG. 1B shows an exploded view of the control arm of FIG. 1A. In FIG. 1B the arm plate holes 260,261 are visible, as well as the arm plate channels 140,141 defined in both arm plates 40,50. FIG. 1B also shows that the slide plate 100 defines both a slide plate hole 101 and a slide plate channel 102. The length of the slide plate channel 102 roughly corresponds to the length of the arm plate channels 140,141. The slide plate channel 102 is positioned between the two arm plate holes 260,261. The arm plate bolt 270 may be inserted through the arm plate hole 261 in the back arm plate 50, pass through the slide plate channel 102 and exit the front arm plate 40 at the front arm plate hole 260. An arm plate bolt 270 thus inserted may extend beyond the exterior surface 155 of the front arm plate 40 such that the arm plate nut 280 may be fixedly attached to it. Likewise, a cam bolt 230 may be inserted into the arm plate channel 141 of the back arm plate 50, pass through the slide plate hole 101 and exit through the arm plate channel 140 of the front arm plate 40. The cam bolt 230 may extend beyond the exterior surface 155 of the front arm plate 40 such that the cam-nut 220 and cam 210 may be fixedly attached to the cam bolt 230.

Figure 1C:
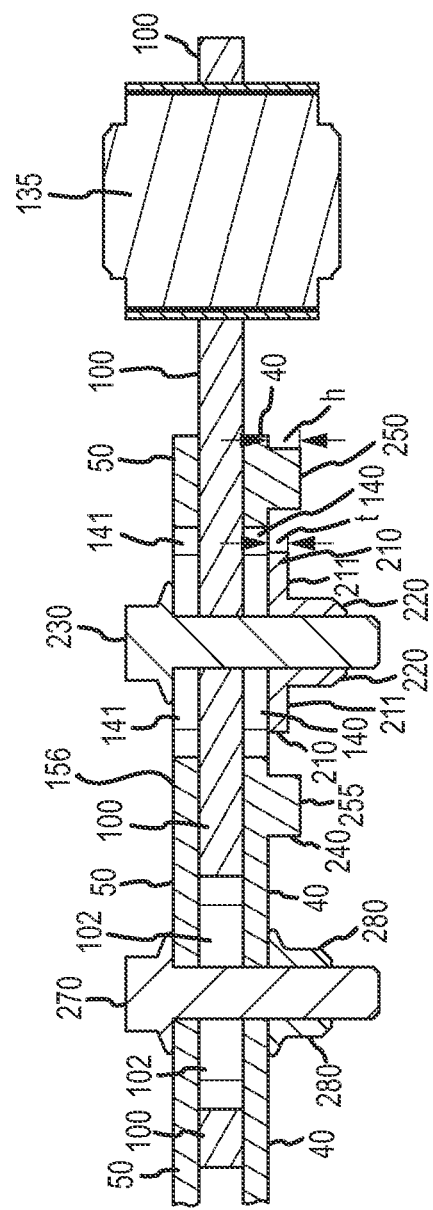
FIG. 1C is a section view of the control arm of FIG. 1A along line 1C-1C.
Figure 1D:
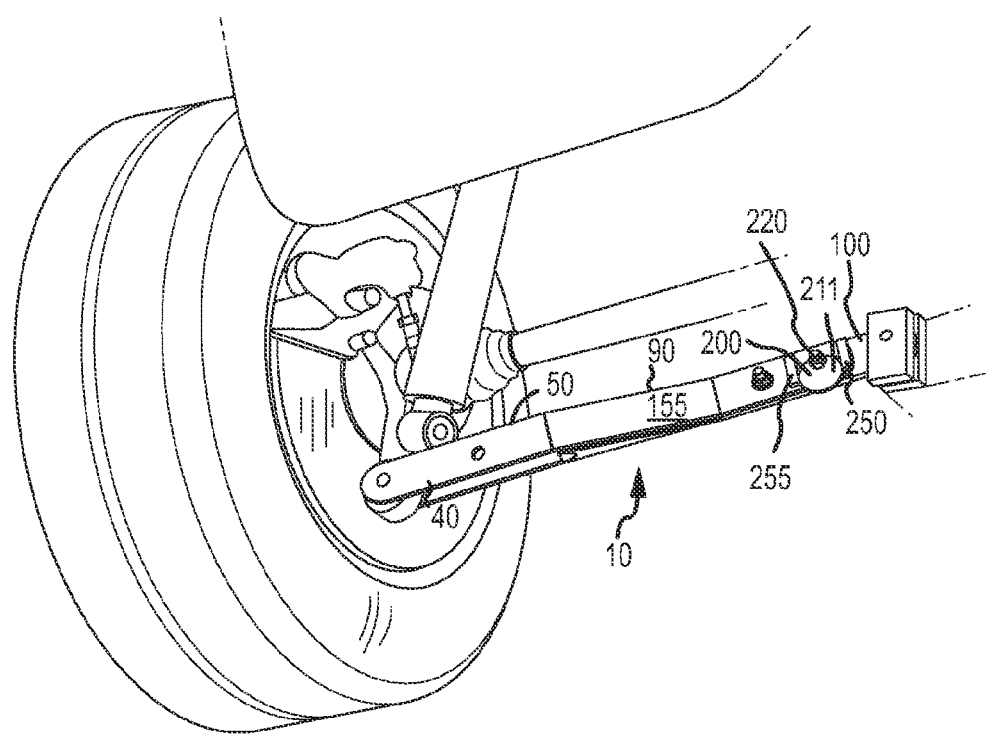
FIG. 1D is a depiction of the control arm of FIG. 1A installed on a vehicle.

FIG. 1C shows a sectional view of the adjustable control arm assembly 10 of FIG. 1B taken along line 1C-1C. FIG. 1C shows the arm bolt 270 and cam bolt 230 passing through the back arm plate 50, slide plate 100 and front arm plate 40, and attached to the arm nut 280, and cam 210 and cam nut 220, respectively. The slide plate channel 102 is visible on either side of the arm bolt 270, and the arm channels 140,141 in the front and back arm plates 40,50, respectively, are visible on either side of the cam bolt 230. The cut away plane has bisected the cam bolt 230, which is positioned roughly in the middle of the arm channels 140,141, and thus at this sectional view the edge 215 of the cam 210 does not appear to touch either the front cam stop 250 or back cam stop 255. In this position, the cam 210 may contact the cam stops 250,255 above the plane depicted in FIG. 1C.

The height, h, of the ridges 240 and the thickness, t, of the cam may be varied. Here the height, h, of the ridges 240 is greater than the thickness, t, of the cam 210. In other embodiments the cam may have a thickness, t, that is greater than the height, h, of the ridges 240. The height of the ridges may be altered to allow the cam-nut 220 to operably engage a tool, for example a wrench, such as a socket wrench.

FIG. 1C also shows that the cam-nut 220 is a single structure. In some embodiments, the cam-nut 220 may be a single piece or may be two pieces, for example a cam 210 and a cam-nut 220, that are fixedly connected. In some embodiments the cam 210 and cam-nut 220 are fixedly attached by welding. In other embodiments the cam 210 and the cam-nut 220 securing the cam 210 may be separate structures such that the cam 210 may be placed against the front arm plate 40 between the ridges 240 and the cam-nut 220 then placed on the cam bolt 230. In embodiments where the cam-nut 220 and the cam 210 are separate pieces, the orientation of the cam-bolt 230 and the cam-nut 220 may be opposite, that is the cam-bolt may pass through the cam 210 first, then through either the front arm plate 40 or the back arm plate 50, and then the slide arm plate 100. If this were the embodiment shown in FIGS. 1A, 1B, and 1C, the cam-nut 220 would be positioned on and in contact with the back arm plate 50. One embodiment, wherein the cam-nut 220 is not fixedly attached to the cam 210, is shown in FIGS. 3A, 3B, 3C, 4A, and 4B. In various embodiments the arm nut and arm bolt may also be opposite the configuration shown in FIG. 1C.

Figure 2A:
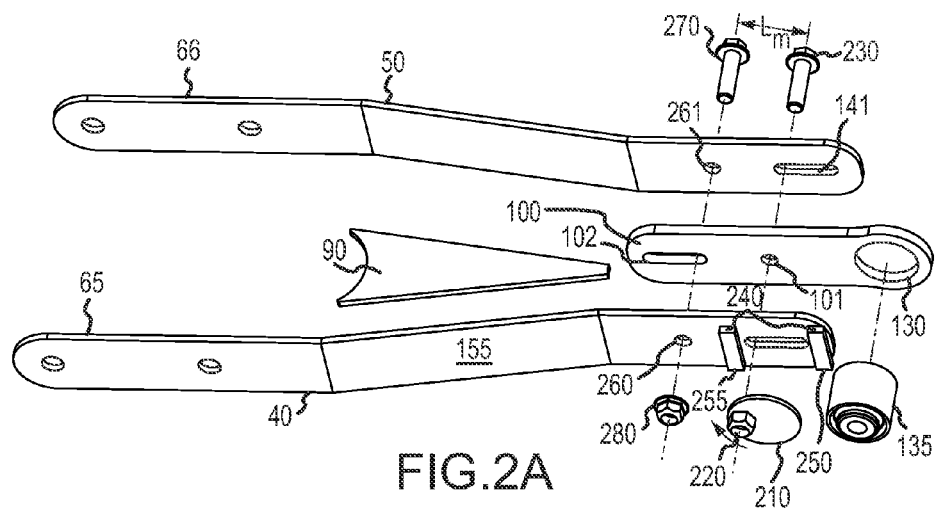
FIG. 2A is an exploded view of the control arm in FIG. 1B with the cam positioned for the control arm's minimal length.
Figure 2B:
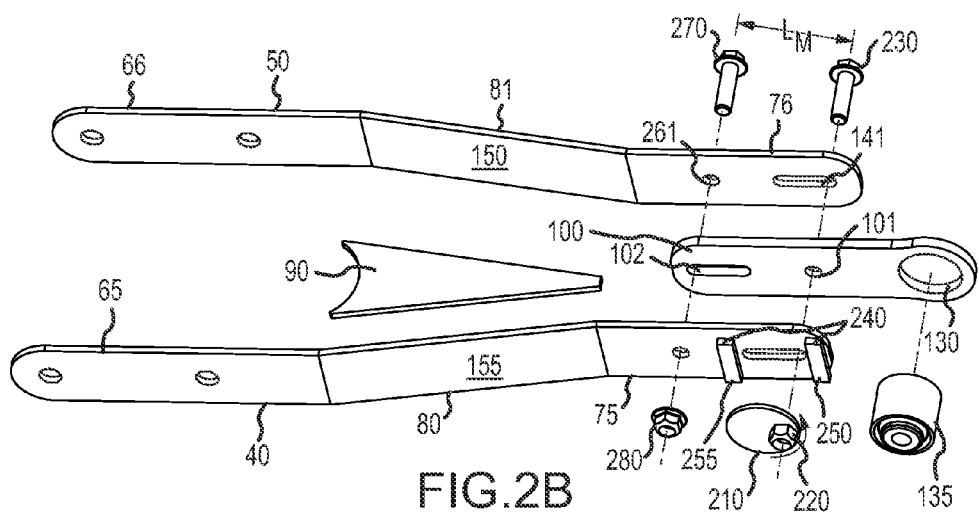
FIG. 2B shows the control arm at its maximum length.

The slide plate 100 is designed to be repositioned relative to the arm plates 40,50. FIGS. 1A, 1B, and 1C show the control arm assembly 10 in an intermediate length. For this position, the cam 210 and cam-nut 220 are positioned with the cam-nut 220 equidistant the front and back cam stops 250, 255. Rotation of the cam-nut 220 may result in rotation of the cam 210 and lateral movement of the cam bolt 230, which in turn pushes against the slide plate hole 101 to move the slide plate 100 relative to the arm plates 40,50. FIGS. 2A and 2B show configurations of the arm plate assembly 10 in its shortest and longest positions, respectively. Movement of the cam 210 and cam-nut 220 clockwise, one-quarter turn from the position shown in FIG. 1B, results in the configuration depicted in FIG. 2A. Movement of the cam 210 and cam-nut 220 counter-clockwise, one-quarter turn from the position shown in FIG. 1B, results in the configuration depicted in FIG. 2B.

FIG. 2A is an exploded view of a control arm assembly 10 as in FIG. 1A, wherein the cam 210 and cam-nut 220 have been turned one-quarter turn clockwise relative to the position depicted in FIG. 1B. This results in a shortened overall length of the control arm assembly 10. Movement of the cam 210 and cam-nut 220 clockwise results in the repositioning of the cam-nut 220 and cam bolt 230 away from the distal end 270 of the arm plates 40,50. As the cam bolt 230 is repositioned laterally within the arm plate channels 140,141, and closer to the proximal ends 60,61 of the arm plates 40,50 and arm plate bolt 270, the cam-bolt 230 pushes against the slide plate hole 101 causing the slide plate 100 to move toward the proximal end 60,61 of the arm plates 40,50. The arm plate bolt 270 does not move relative to the front or back arm plates 40,50. However, relative to the slide plate 100, the arm plate bolt 270 moves laterally within the slide plate channel 102 and toward the slide plate hole 101. Movement of the cam 210 and cam-nut 220 as shown in FIG. 2A may result in reducing the separation distance between the arm bolt 270 and the cam bolt 230 to its minimum, m. In some embodiments, all of the slots can be in the arm plates and the slide plate can have two holes, which would result in a constant separation of arm bolt 270 and cam bolt 230 distance regardless of adjustment position.

FIG. 2B is an exploded view of a control arm assembly 10, wherein the cam 210 and cam-nut 220 have been turned one-quarter turn counter-clockwise relative to the position depicted in FIG. 1B. This results in a lengthening of the overall length of the control arm assembly 10 relative to that shown in FIG. 1B. Movement of the cam 210 and cam-nut 220 in a counter-clockwise direction results in the repositioning of the cam-nut 220 and cam bolt 230 closer to the arm bolt 270. Rotation of the cam 210 and cam-nut 220 causes the cam bolt 230 to be repositioned laterally within the arm plate channels 140,141. As the cam bolt 230 moves laterally within the arm plate channel 140, the cam bolt 230 pushes against the wall of the slide plate hole 101 causing the slide plate 101 to move away from the proximal ends 60,61 of the arm plates 40,50. This movement causes the slide plate 100 to extend further beyond the distal end 70 of the arm plates 30,50. The arm plate bolt 270 does not move relative to the arm plates 40,50. However, relative to the slide plate 100, the arm plate bolt 270 moves laterally within the slide plate channel 102 and away from the cam bolt 230. Movement of the cam 210 and cam-nut 220 as shown in FIG. 2B may result in a maximal separation distance, M, between the arm bolt 270 and the cam bolt 230. The difference between the maximal arm bolt-cam bolt separation, M, and the minimum separation, m, may correspond to the adjustment length of the cam-adjustable control arm assembly 10.

One of skill in the art will appreciate that the cam 210 and cam-nut 220 depicted in FIGS. 1 and 2, may also be installed wherein the cam-nut 220 is at the top of the cam 210, rather than at the bottom of the cam 210 as depicted in FIG. 1. In this embodiment, the lengthening rotation would be clockwise, and the shortening rotation would be counter-clockwise.

After adjusting the cam-adjustable control arm assembly 10 to the desired length by rotating the cam 210, the control arm assembly 10 may be secured at that desired length. To secure the control arm assembly 10, the cam 210 is held securely to prevent rotation, while the cam bolt 230 is tightened. The arm bolt 270 and arm nut 280 are also fixedly secured. In some embodiments the arm bolt 270 and cam bolt 230 are threaded, with the arm nut 280 and cam-nut 220 being correspondingly threaded. In a threaded bolt embodiment, the cam-nut 220 and arm nut 280 may be held in place with a tool, such as a wrench, while the corresponding cam-bolt 230 or arm-bolt 270 is rotated to fixedly secure the cam 210, front arm plate 40, slide plate 100, and back arm plate 50. By fixedly securing the control arm assembly 10, the slide arm plate 100 may be prevented from moving in relation to the arm plates 40,50. In other embodiments the arm nut 280 may be rotated while the arm bolt 270 is prevented from rotating, or the arm bolt 270 may be rotated in the opposite direction to the rotation of the arm nut 280.

Slotted Cam

Figure 3A:
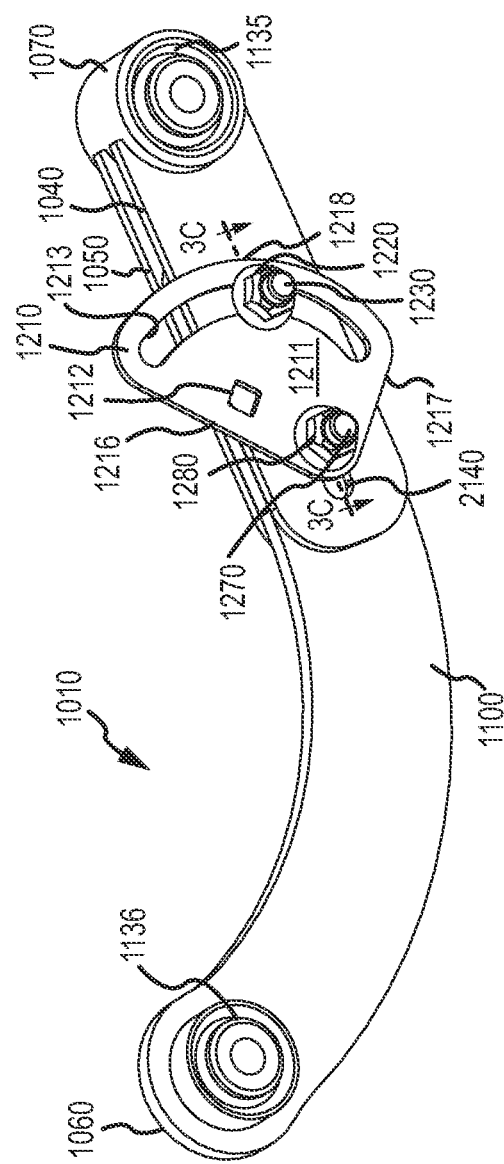
FIG. 3A is a perspective view of an embodiment of the inventive cam-adjustable control arm having a slotted cam.

In another aspect of the present inventive cam adjustable control arm 1010, as shown in FIG. 3A, the adjustable control arm assembly 1010 may be arcuate and/or the corresponding cam structure 1210 may be other than circular. In this embodiment the slide plate 1100 may define an arcuate shape and may be positioned between two flat, parallel, and straight arm plates 1040,1050 (note that in various embodiments the arm plates may also be curved). The embodiment of FIG. 3A may also have a cam 1210 that is generally a right triangle, having a long side 1216, a short side 1217, and a hypotenuse 1218. The embodiment of FIG. 3A has an arcuate (such as, for example, circular or spiral) hypotenuse 1213. This cam 1210 embodiment may be referred to as a slotted or "banana" cam. The slotted cam 1210 may have an exterior surface 1211 positioned away from the arm plate 1040,1050. The exterior surface 1211 of the slotted cam 1210 may define a plurality of openings that may pass through the slotted cam 1210 to an interior surface (not visible). One opening may be a pivot hole 1275, which in FIG. 3A is obscured by the pivot nut and may be positioned near the right angle of the roughly triangular shaped slotted cam 1210 where the long side 1216 and short side 1217 may converge. The pivot hole 1275 may be designed to accept a pivot bolt 1270. The slotted cam 1210 may also include an arcuate channel 1213 opening positioned near and parallel to the arcuate hypotenuse 1218. The arcuate channel 1213 may also be designed to accept a slotted cam bolt 1230.

In some embodiments the slotted cam 1210 may be other than triangular shaped, and the channel 1213 may be other than arcuate, for example the slotted cam may be square or circular, and the channel may be straight. The shape of the slotted cam 1210 may be designed to aid in rotation of the slotted cam 1210.

While a shape similar to a mild spiral works, another shape may provide a different angle vs. length ratio. However, in these embodiments of the slotted cam one end of the channel will be closer to the pivot hole than the other. One such embodiment would use two arcuate channels on the same cam—one for each bolt. This would reduce the amount of angle required for a given length change and provide the same or better rotational effort as a single-arc design. Additionally, this embodiment could employ a pin that is pressed into a hole in the arm plate that rides in a third channel/slot in the cam plate to keep it centered on the side of the arm plate throughout the rotational range of the cam. See the description of FIGS. 8A-8C below.

A third opening 1212 may be positioned on the surface of the D-cam between the pivot hole and the D-cam channel. In the embodiment shown in FIG. 3A, the third opening 1212 is a square hole that may be used to rotate the slotted cam 1210 by means of a standard socket driver tool (i.e. ratchet or 'breaker bar').

In FIG. 3A, a pivot bolt 1270 passes through the pivot hole 1275 and extends outward beyond an exterior surface 1211 of the slotted cam 1210. Positioned at the end of the pivot bolt 1270 is a pivot nut 1280. An cam bolt 1230 may pass though the slotted cam channel 1213 and extend beyond the exterior surface 1211 of the slotted cam 1210. A cam nut 1220 is fixedly positioned on the slotted cam bolt 1230.

Figure 3B:
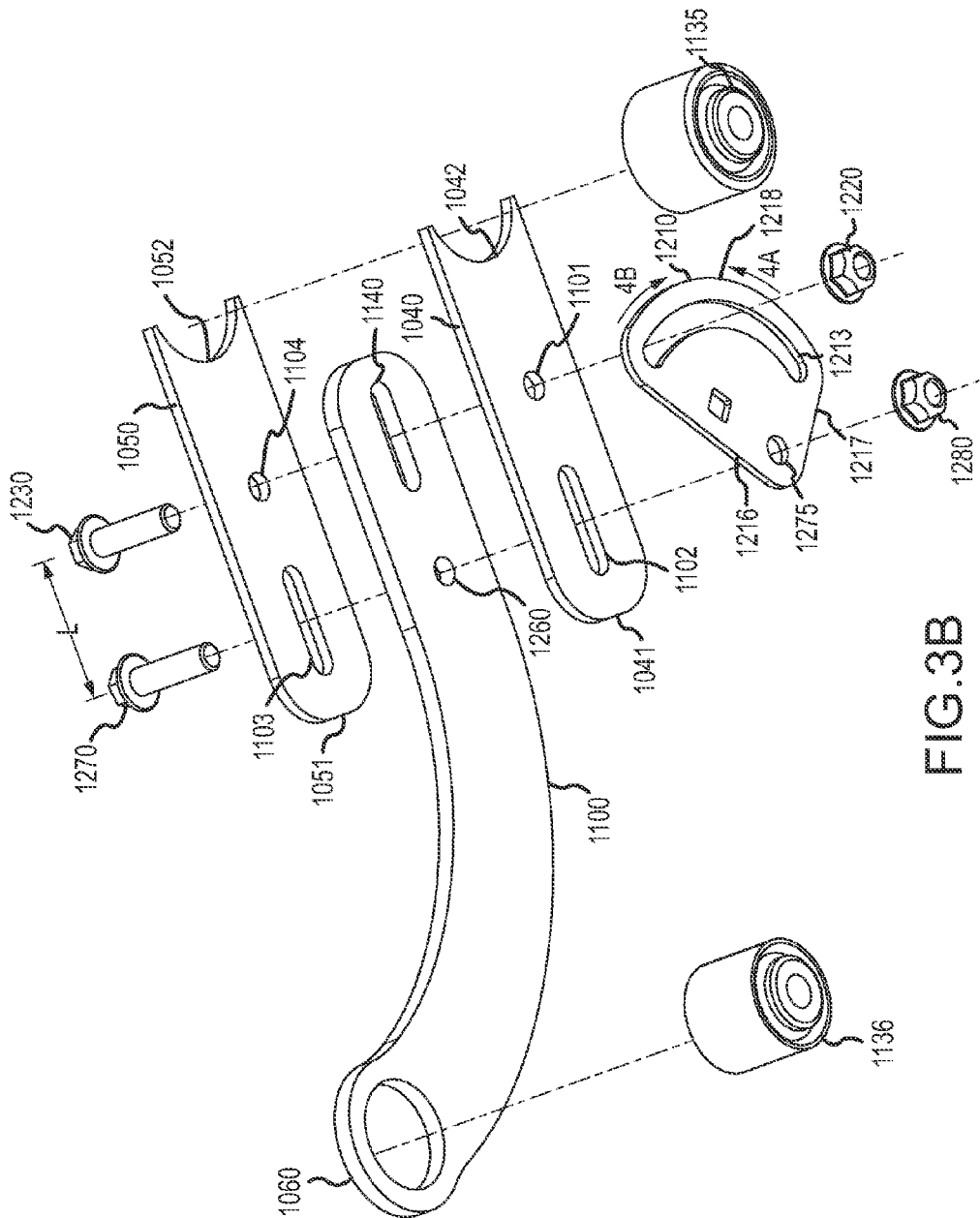
FIG. 3B is an exploded view of the control arm of FIG. 3A.

FIG. 3B is an exploded view of the slotted cam adjustable control arm 1010 of FIG. 3A. In FIG. 3B, the arm plate channel 1102 can be seen in the front arm plate 1040, and a corresponding arm plate channel 1103 can be seen in the back arm plate 1050. The slide plate 1100 may define a hole 1260 and a channel 1140 positioned away from the proximal end 1060 of the slide arm 1100. The slide plate channel 1140 has a length that is parallel to the long axis of the arm plates 1040,1050. The slide plate hole 1260 may also be positioned on this long axis closer to the proximal end 1060 of the slide plate 1100. The slide plate channel 1140 may be positioned between the arm plate holes 1101,1104 of the front arm plate 1040 and the back arm plate 1050, respectively, such that the slotted cam bolt 1230 may be inserted though the arm hole 1104 of the back arm plate 1050, pass through the slide plate channel 1140 and exit the front arm plate 1040 at the arm hole 1101. The slotted cam bolt 1230 may further pass through the slotted cam channel. The pivot bolt 1270 may be inserted into the arm plate channel 1103 of the back arm plate 1050, pass through the slide plate hole 1260 and exit the front arm plate 1040 at the arm plate channel 1102. The pivot bolt 1270 may further pass through the pivot hole 1275 of the slotted cam 1210 and be fixedly attached by the pivot nut 1280. FIG. 3C is a cut-away view of the slotted cam adjustable control arm of FIG. 3A.

Figure 4A:
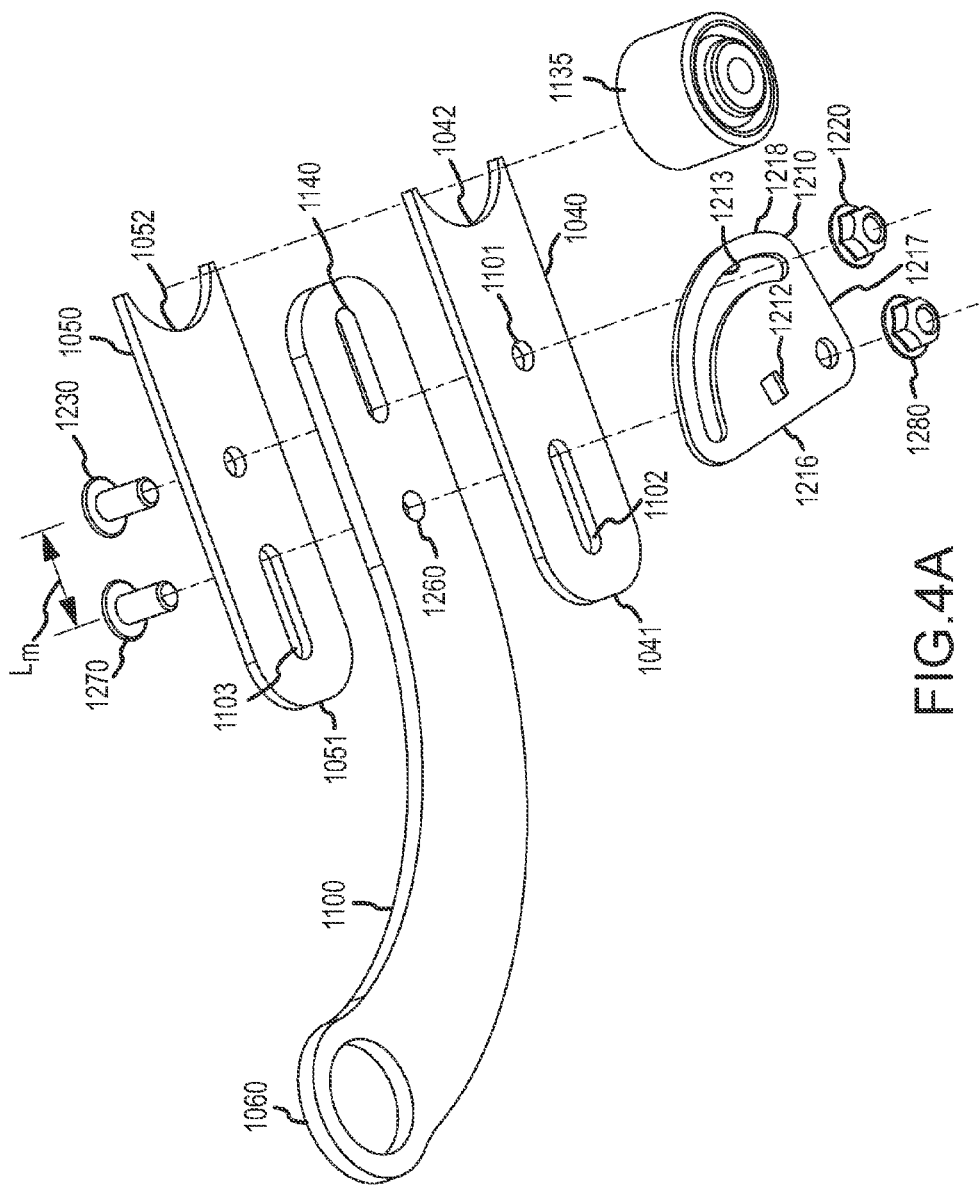
FIG. 4A is an exploded view of the control arm in FIG. 3B with the cam positioned for the control arm's minimal length.
Figure 4B:
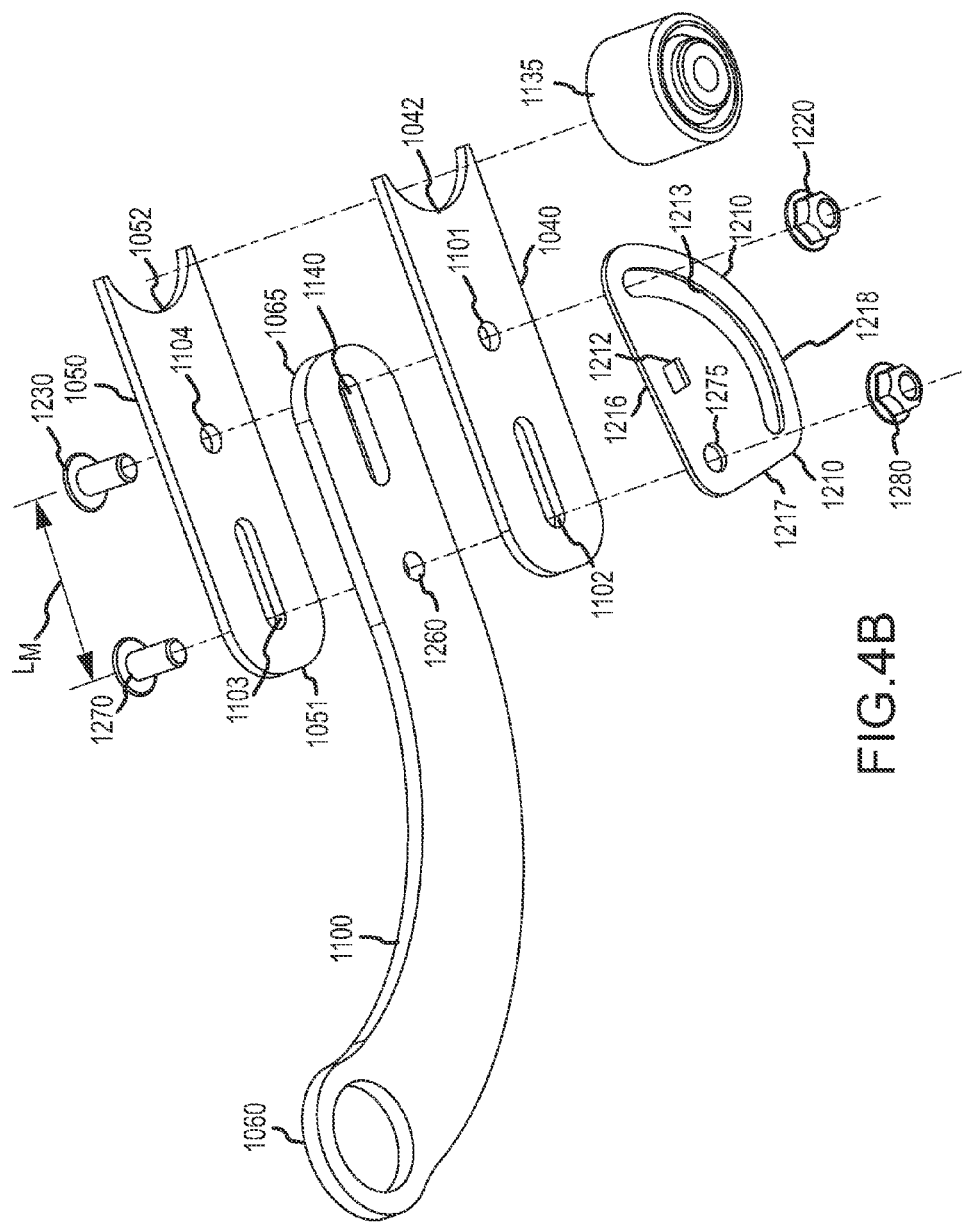
FIG. 4B shows the control arm of FIG. 3B at its maximum length.

The slotted cam adjustable control arm 1010 shown in FIGS. 3A and 3B may be reconfigured for different lengths. The position of the slotted cam bolt 1230 in the slotted cam channel 1213 may indicate the overall length of the control arm 1010. Here, in FIGS. 3A and 3B, the slotted cam bolt 1230 is positioned midway in the slotted cam channel 1213, thus the overall length is roughly midway between the maximum and minimum control arm length. Pivoting the slotted cam 1210, such that the slotted cam bolt 1230 is at one end of the slotted cam channel 1213, will result in a control arm length that is either maximal or minimal. FIGS. 4A and 4B show the result of pivoting the slotted cam until the slotted cam bolt 1230 is nearest the short side 1217 of the slotted cam 1210 (FIG. 4A), or the long side 1216 of the slotted cam 1210 (FIG. 4B). The arrows near the slotted cam in FIG. 3B indicate the direction the slotted cam moves by pivoting at the pivot hole around the pivot bolt.

FIG. 4A shows the slotted cam adjustable control arm 1010 at its minimal length. In this position, the slotted cam bolt 1230 is at the bottom of the arcuate slotted cam channel 1213 and closest to the short side 1217 of the slotted cam 1210. Relative to the configuration in FIG. 3B, the pivot bolt 1270 is re-positioned within the arm plate channels 1102,1103 such that it is nearer the bushing ends 1042,1052 of the front and rear arm plates 1040,1050. Likewise the slotted cam bolt 1230 is re-positioned within the slide arm channel 1140 nearer to the proximal end 1060 of the slide plate 1100. In this configuration, the distance separating the pivot bolt 1270 and slotted cam bolt 1230, $L_m$, is less than the separation distance, L, shown in FIG. 3B. Again, the slot arrangement may be 'parallel' rather than reversed between the plates so that L remains constant.

FIG. 4B shows the slotted cam adjustable control arm 1010 at its maximal length. In this position, the slotted cam bolt 1230 is at the top of the arcuate slotted cam channel 1213 and closest to the long side 1216 of the slotted cam 1210. Relative to the configuration in FIG. 3B, the pivot bolt 1270 is re-positioned within the arm plate channels 1102,1103 such that it is closest the proximal end 1060 of the slide plate 1100. Likewise the slotted cam bolt 1230 is re-positioned within the slide arm channel 1140 nearer to the distal end 1065 of the slide plate 1100. In this configuration, the distance separating the two bolts, $L_M$, is greater than the separation distance, L, shown in FIG. 3B.

After adjusting the slotted cam adjustable control arm 1010 to the desired length, the control arm 1010 may be secured at that length by tightening the pivot nut 1280 and slotted cam nut 1220 on the pivot bolt 1270 and slotted cam bolt 1230, respectively. By tightening the pivot nut 1280 on the pivot bolt 1270 and the slotted cam nut 1220 on the slotted cam bolt 1230, the slotted cam 1210, front arm plate 1040, slide plate 1100, and back arm plate 1050 may be brought into fixed communication such that the slide arm plate 1100 may be prevented from moving in relation to the arm plates 1040, 1050.

In some aspects of the slotted cam embodiment, the orientation of the slotted cam 1210 may be reversed such that the slotted cam bolt 1230 would pass through the pivot hole 1275 of the slotted cam 1210 and the pivot bolt 1270 passes through the slotted cam channel 1213. In this embodiment, movement of the cam causes the pivot bolt 1270 to be repositioned within the arm plate channel 1102 and the slotted cam channel 1213.

Ball-Joint Arm

Figure 5A:
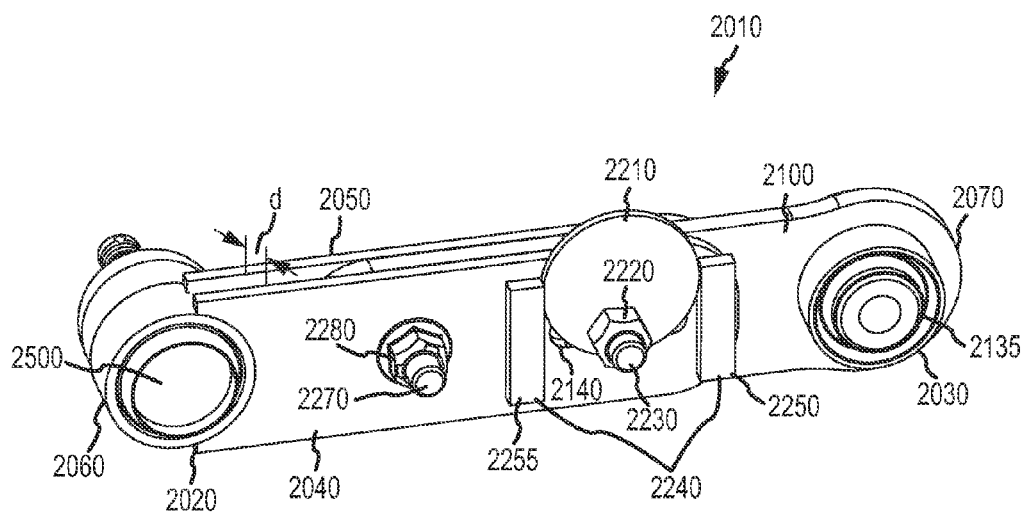
FIG. 5A is a perspective view of an embodiment of the inventive cam-adjustable control arm having a ball-joint on one (or both) ends.

In some embodiments the control arm may comprise a bushing 2135 at one end and a ball joint 2500 at a second end. FIG. 5A shows a control arm assembly 2010 wherein a ball joint 2500 is positioned at a proximal 2060, first attachment end 2020, and a bushing 2135 is positioned at a distal 2070, second attachment end 2030. In this embodiment front and rear arm plates 2040,2050 have one section and the arm plates 2040,2050 may define a separation distance, d, that may be generally constant. A slide plate 2100 may be positioned between the arm plates 2040,2050. In various embodiments, the ball joint 2500 may be operably connected to a spindle knuckle on a wheel assembly or to a point on the frame or both (such as is common in steering linkages—a purpose to which this inventive arm could also be applied).

Figure 5B:
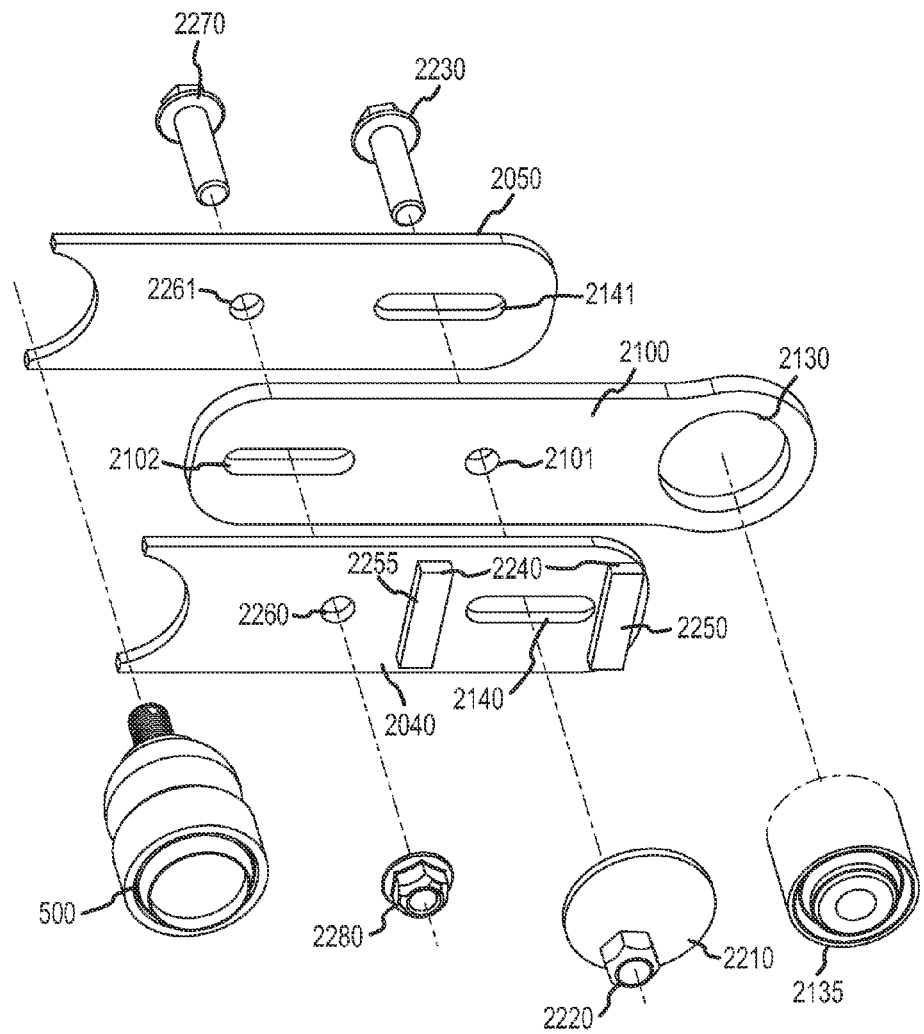
FIG. 5B is an exploded view of the control arm of FIG. 5A.

FIG. 5B is an exploded view of the control arm 2010 of FIG. 5A. This view shows that an arm bolt 2270 may be inserted into the back arm plate 2050 and pass through the back arm plate 2050 through an arm hole 2260, through the slide plate at a slide plate channel 2102, and through the front arm plate 2040 at an arm hole 2260. The arm bolt 2270 may then be fixedly attached to an arm nut 2280. A cam bolt 2230 may be inserted through the back arm plate 2050 at the arm channel 2140, through the slide plate 2100 at the slide plate hole 2101, and exit the front arm plate 2040 at the arm plate channel 2140. The cam bolt 2230 may also pass through a cam 2210 and be secured with a cam nut 2220. On either side of the arm plate channel 2140 may be ridges 2240, forming a front cam stop 2250 and a back cam stop 2255. The cam stops 2250,2255 may be separated by a distance approximately equal to, or slightly greater than, the diameter of the cam 2210.

Multiple Cam Control Arms: A-Arm

Figure 6B:
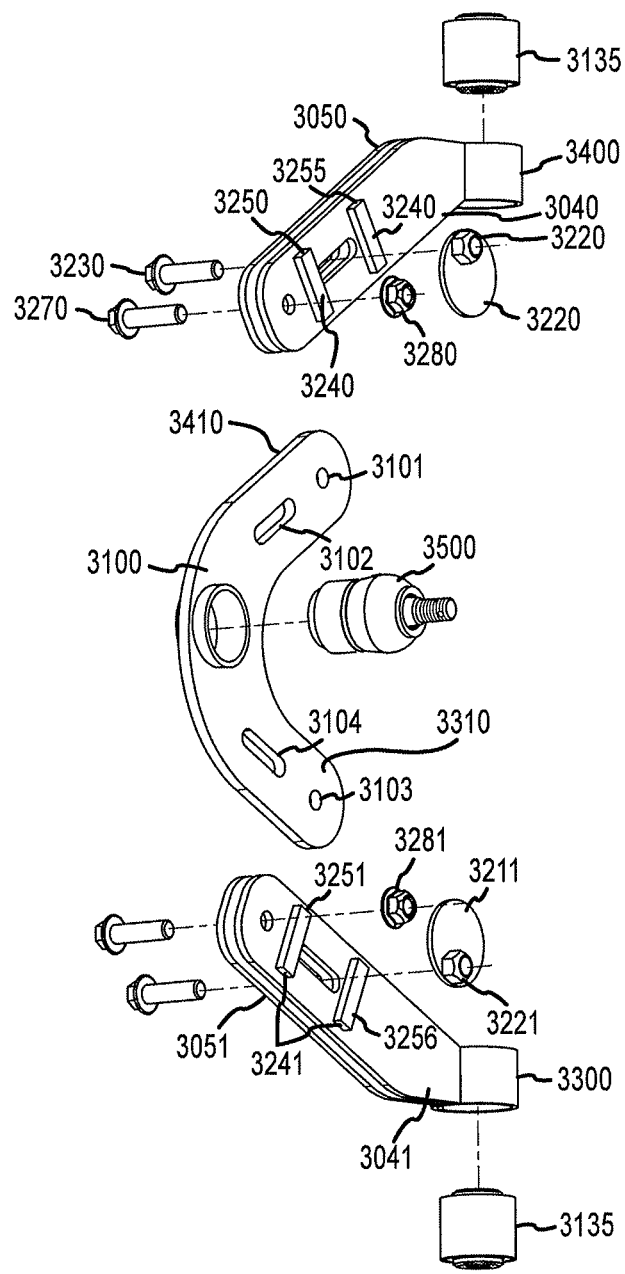
FIG. 6B is an exploded view of the control arm of FIG. 6A.

In various embodiments the control arm may have a plurality of cam adjustment mechanisms. One such control arm assembly 3010 is shown in FIGS. 6A and 6B. This control arm 3010 embodiment is "A-shaped," with a left arm 3300 and a right arm 3400. Other embodiments may be other shapes, for example straight. The slide plate 3100 of the example of FIGS. 6A and 6B is angled with a left end 3310 and a right end 3410. The slide plate 3100 has an adjustment mechanism at both ends 3310,3410 that engage the left arm 3300 and right arm 3400 of the control arm 3010, respectively. The left arm 3300 and right arm 3400 each include cam adjustment structures. In the embodiment of FIG. 6A, the cam structures are of a similar type, other embodiments with multiple cam adjustment mechanisms may have cams of differing types, for example a circular cam as shown in FIG. 6A, and a slotted-cam as depicted in FIG. 3A. In some embodiments of multi-cam control arms, an attachment end may be positioned at or near the middle of the slide plate (as depicted in FIG. 6A), while other multi-cam embodiments may not have a attachment end positioned at the slide plate. The embodiment shown in FIGS. 6A and 6B has a ball joint 3500 positioned at or near the center of the slide plate 3100. At the ends of the left arm 3300 and right arm 3400 may be attachment ends, for example, as shown in FIGS. 6A and 6B, bushings 3136,3135.

The control arm shown in FIGS. 6A and 6B may be an upper control arm. A control arm as in FIGS. 6A and 6B may aid in adjusting both control arm length and/or angle, such as camber and caster.

In some embodiments of multi-cam control arms, the cams may be slotted-cams. In some embodiments the cams on a control arm may be different for example, one cam may be circular with a hole for receiving a bolt, and a second cam, such as a slotted cam, with openings for accepting two bolts.

FIGS. 7A and 7B show an embodiment of the cam length adjustment mechanism comprising one arm plate 4040 and one slide plate 4100. The arm plate 4040 has a C-shaped cross section in which the slide plate 4100 is received into the interior 4041. The slide plate 4100 may move or slide longitudinally within the arm plate 4040 interior 4041. Like the mechanism discussed above, and specifically referring to FIG. 1B for explanation, the cam 4210 is attached to a cam bolt 4230, by a cam nut 4220. As depicted in FIG. 7C, the slide plate 4100 defines a slide plate hole 4101, and the arm plate 4040 includes an arm plate slot 4140 therein, along with cam stops 4250,4255. The cam bolt 4230 extends through the longitudinal guide slot 4141 formed along the length of guide side 4042 of the arm plate 4040 (the slot 4141 creating the formation of the C-shaped cross section of the arm plate 4040). As with the above structure, the cam 4210 is rotated using the cam nut 4220 (or similar structure) causing the slide plate 4100 to move longitudinally within the interior 4141 of the arm plate 4040. The arm plate 4040 and slide plate 4100 may be fixed in relation to one another by tightening the cam nut 4220 on the threaded end of the cam bolt 4230. The head of the cam bolt 4230 may be kept from being pulled into the longitudinal guide slot 4042 by a washer 4231, in other embodiments the head of the cam bolt 4230 is wider than the opening of the longitudinal guide slot 4042. This example requires one bolt, with the arms of the C-shaped cross section retaining the slide plate from rotating or pivoting out of alignment with the arm plate.

Multiple Cam Control Arms

Figure 8A:
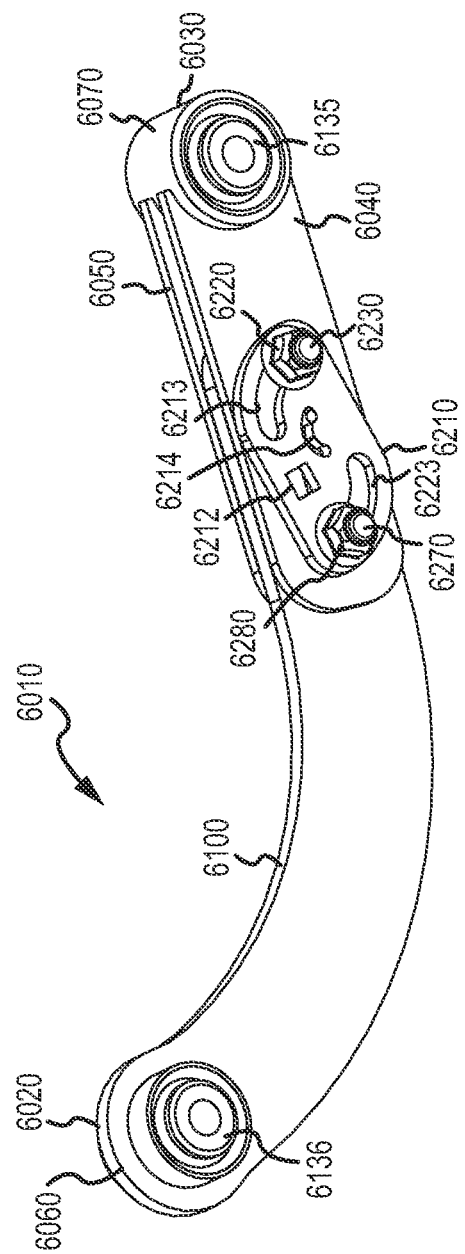
FIG. 8A is a perspective view of an adjustable control arm having a J-shape, and having a cam adjustment mechanism using a cam plate having two slots formed therein, and a guide pin.

Referring to FIGS. 8A, 8B, and 8C, another example of the cam adjustment mechanism is shown. This example is of a "J-arm" shape. The control arm assembly of FIG. 8A may have a first end 6020 and a second end 6030 forming at least a partially curved control arm 6010, similar to that shown in FIGS. 3A-C and 4A-B. The cam adjustment mechanism in this example includes a cam plate 6210 having two slots 6213,6223 for a first cam bolt 6230 and a second cam bolt 6270, respectively, to travel along. Movement of the cam bolts 6230,6270 may allow adjustment of a slide plate 6100 relative to a front arm plate 6040 and a rear arm plate 6050 as described above. The cam plate of the examples in FIGS. 3A-C and FIGS. 4A-B, pivots around a single point during the adjustment. This can cause the cam plate, given its generally triangular or wedge shaped structure to extend significantly past the perimeter edge of the arm plate and/or slide plate. This may cause issues for clearance with nearby components. In contrast, the cam plate 6220 depicted in FIGS. 8A-C rotates and translates to reduce or eliminate the extension of the cam plate 6210 outside the perimeter edge of the arm plates 6040,6050 and slide plate 6100. The cam plate 6210 depicted in FIGS. 8A-C has a generally oval shape, with two curved slots 6213,6223 formed therein, one curved slot 6213 positioned near a first end 6263 and a second curved slot 6223 positioned near a second end 6264. A square aperture 6212 may be formed in the cam plate 6210, as in various other cam embodiments. The square aperture 6212 may allow the cam plate 6210 to be adjusted with a tool. A pin 6224 extends from the exterior surface 6155 of the front arm plate 6040, and is received in a guide slot 6214 formed in the cam plate 6210. The guide slot 6214, in this embodiment, is positioned near the middle of the cam plate 6210 and is curved to guide the cam plate 6210 to rotate and translate in a relatively defined manner. In some embodiments, the pin 6224 and guide slot 6214 may not be present. In some embodiments, a pin 6224 and guide slot 6214 may aid in creating a more defined movement of the cam plate 6210 for easier adjustment, compared to embodiments that lack the pin 6224 and guide slot 6214. FIGS. 8B-C show this example in exploded view (FIG. 8B) and sectional view (FIG. 8C) to show the internal structure of the cam adjustment mechanism.

As depicted in FIGS. 8A-C, the first cam bolt 6230 extends through the arm hole 6104 of the back arm plate 6050, through a slide channel 6140 of the slide plate 6100 and through the arm hole 6101 of the front arm plate 6040 and through the first curved channel 6213 of the cam plate 6210. The first cam bolt may be secured by a first cam nut 6220. The second cam bolt 6270 extends through the arm channel 6103 of the back arm plate 6050, through a slide hole 6260 of the slide plate 6100 and through the arm channel 6102 of the front arm plate 6040 and through the second curved channel 6223 of the cam plate 6210. The second cam bolt may be secured by a second cam nut 6280. The slot configuration in the arm plates and slide plates are similar to those shown in FIGS. 3 and 4. FIG. 8C shows a cross section taken through the length of the control arm as shown in FIGS. 8A and 8B. The cross section is similar to the other cross sections shown herein, but differ most from those embodiments in comprising a guide pin 6224 positioned in the front arm plate 6040 and a guide slot 6214 positioned in the cam plate 6210.

Adjustment of Control Arm Length

In various embodiments the movement, rotation, or pivoting of the cam may accompany a change in the overall length of the inventive control arm. For example, embodiments having a cam and cam-nut, as depicted in FIGS. 1 and 2, may be adjusted by turning the cam at the cam nut with, for example, a wrench. In the cam/cam-nut embodiment, as well as other embodiments, the cam may be manually twisted by grasping the cam at its edge and causing the cam to rotate about a bolt, such as a cam bolt or a pivot bolt. In some embodiments the cam may include a raised portion for grasping and twisting the cam, for example a wing or a lever. In some embodiments the edge of the cam may be designed to aid in rotation, for example by defining ridges, or tool insertion points. The exterior surface of the cam may further define a lever, ridge, or indentation for engaging a digit, tool, device, or implement, which may aid in rotating the cam. In some embodiments the cam surface may define a hole for insertion of a tool to assist rotation.

In many embodiments, the control arm length may be adjusted by loosening a bolt and nut on the cam, and any other securing structures that may aid in preventing the arm plate and slide plate from moving in relation to each other. After the cam nut and cam bolt have been loosened, the control arm length may be adjusted by pulling at or pushing on the slide plate and/or arm plate such that the two plates move relative to each other. In some aspects a force may be applied by spring, hand, or gravity, for example where the vehicle is on a jack and the wheel assembly is unsupported and compresses or extends the control arm. In some embodiments, such as a slotted cam embodiment, two bolts and/or nuts must be loosened to allow the cam to be repositioned.

Embodiments of the present inventive adjustable control arms may be adjusted before or after connecting the control arm to a vehicle. For example, in reference to the embodiment shown in FIGS. 1 and 2, the cam/nut and the arm nut may be loosened if necessary to allow the cam to rotate. The cam may be rotated by turning the cam/nut or by rotating the cam structure at the installation of the control arm. In other embodiments, the length of the control arm may be adjusted while the first and/or second attachment end is in communication with the vehicle.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An adjustable vehicle control arm comprising:
a pair of arm plates spaced apart from one another;
a slide plate slidably positioned between said arm plates;
said arm plates and said slide plate together defining opposing ends of the control arm, one of said opposing ends attached to a vehicle frame, the other of said opposing ends attached to a wheel assembly;
a cam adjustment mechanism associated with said arm plates and said slide plate, said cam adjustment mechanism including a cam plate attached to the control arm between said opposing ends;
said cam plate movable relative to said arm plates and said slide plate to cause relative movement between said arm plates and said slide plate, thus adjusting the position of said wheel assembly relative to said vehicle frame.

2. An adjustable vehicle control arm as defined in claim 1, wherein:
said cam plate is positioned on one of said arm plates;
a cam stop is positioned on same said arm plate and in contact with said cam plate.

3. An adjustable vehicle control arm as defined in claim 2, wherein:
said cam plate is circular and pivots relative to said arm plates.

4. An adjustable vehicle control arm as defined in claim 3, wherein:
said cam stop is a bar attached to said arm plate.

5. An adjustable vehicle control arm as defined in claim 2, wherein:
said cam plate defines a curved slot therein, and pivots relative to said arm plates.

6. An adjustable vehicle control arm as defined in claim 2, wherein:
said cam plate has two curved slots formed therein, and rotates relative to said arm plates.

7. An adjustable vehicle control arm as defined in claim 6, wherein:
a cam stop is defined in said one of said arm plates and extends through a guide slot formed in said cam plate.

8. An adjustable vehicle control arm as defined in claim 7, wherein:
said cam stop is a pin attached to said one of said arm plates and received in said guide slot.

9. An adjustable vehicle control arm as defined in claim 1, wherein:
said arm plates and said slide plate form a linear member.

10. An adjustable vehicle control arm as defined in claim 1, wherein:
said arm plates and said slide plate form a curved member.

11. An adjustable vehicle control arm as defined in claim 1, further comprising:
a second pair of arm plates spaced apart from one another;

said slide plate slidably positioned between said second arm plates;

said second arm plates, said arm plates, and said slide plate together defining said opposing ends, and said second arm plates being positioned spaced apart from said arm plates;

a second cam adjustment mechanism associated with said second arm plates and said slide plate, said second cam adjustment mechanism including a second cam plate;

said second cam plate movable relative to said second arm plates and said slide plate to cause relative movement between said second arm plates and said slide plate.

12. An adjustable vehicle control arm as defined in claim 1, wherein:

said control arm comprises at least one ball joint.

13. An adjustable vehicle control arm as defined in claim 12, wherein:

said control arm is part of a steering linkage.

14. An adjustable vehicle control arm as defined in claim 1, wherein:

said control arm comprises at least one bushing.

15. An adjustable vehicle control arm comprising:

an arm plate having a first surface, a second surface, a channel extending through said arm plate from said first surface to said second surface, and a plurality of ridges positioned on said first surface about said channel;

a slide plate in slidable contact with said arm plate and defining at least one hole, wherein said slide plate is moveable relative to said arm plate so as to change an overall length of the control arm; and a cam plate.

16. The adjustable vehicle control arm of claim 15, wherein said cam plate defines at least one hole in said cam plate, wherein said cam plate is rotatably positioned against said first surface of said arm plate.

17. The adjustable vehicle control arm of claim 16, further comprising a bolt extending through said channel of said arm plate, said at least one hole of said slide plate, and said at least one hole of said cam plate.

18. The adjustable vehicle control arm of claim 17, wherein said bolt is secured by a nut.

* * * * *